US007732747B2

(12) United States Patent
Wieler et al.

(10) Patent No.: US 7,732,747 B2
(45) Date of Patent: Jun. 8, 2010

(54) TOOL WITH CONTACTLESS SWITCH

(75) Inventors: Michael Wieler, Schorndorf (DE); Manfred Zurawski, Gschwend (DE); Guenther Henzler, Stuttgart (DE); Andreas Fluhrer, Murrhardt (DE); Marcus Kiesslich, Backnang (DE); Andreas Scharfenberg, Murrhardt (DE)

(73) Assignee: Bosch Rexroth AG, Stuttgart (DE)

( * ) Notice: Subject to any disclaimer, the term of this patent is extended or adjusted under 35 U.S.C. 154(b) by 0 days.

(21) Appl. No.: 11/566,758

(22) Filed: Dec. 5, 2006

(65) Prior Publication Data

US 2007/0127168 A1 Jun. 7, 2007

(30) Foreign Application Priority Data

Dec. 7, 2005 (DE) ...................... 10 2005 058 613

(51) Int. Cl.
*F16P 3/14* (2006.01)

(52) U.S. Cl. .................... 250/208.4; 250/221; 307/117; 307/326

(58) Field of Classification Search .............. 250/208.4, 250/214 AL, 239, 221; 362/119; 327/326; 408/4, 8; 340/555–557
See application file for complete search history.

(56) References Cited

U.S. PATENT DOCUMENTS 4,859,869 A * 8/1989 Heuwinkel et al. .......... 307/117
5,076,805 A * 12/1991 Welch ........................ 439/568
5,169,225 A * 12/1992 Palm .......................... 362/118
5,210,996 A * 5/1993 Fassauer ..................... 56/12.8
5,772,291 A * 6/1998 Byrd et al. ............... 312/34.22
6,494,590 B1 * 12/2002 Paganini et al. ............. 362/119
6,810,596 B2 * 11/2004 Fung et al. .................... 33/334
7,200,516 B1 * 4/2007 Cowley ...................... 702/151
2003/0194283 A1 * 10/2003 Kovarik et al. ................. 408/4
2003/0202851 A1 * 10/2003 Kovarik ......................... 408/8
2006/0070459 A1 4/2006 Kugler
2007/0044983 A1 * 3/2007 Wuensch et al. ............ 173/217

FOREIGN PATENT DOCUMENTS

DE 103 15 980 11/2003
DE 10 2004 047 232 4/2006
JP 06205732 7/1994

* cited by examiner

*Primary Examiner*—Thanh X Luu
*Assistant Examiner*—Francis M Legasse, Jr.
(74) *Attorney, Agent, or Firm*—Michael J. Striker

(57) ABSTRACT

An electric tool has a handle, and an element for varying tool functions located in the handle and including a photoelectric cell incorporated onto the handle in such a way that if the photoelectric cell is completely or partly covered, a tool function is achieved on a specification in accordance with a predetermined sequence.

6 Claims, 1 Drawing Sheet

TOOL WITH CONTACTLESS SWITCH

CROSS-REFERENCE TO A RELATED APPLICATION

The invention described and claimed hereinbelow is also described in German Patent Application DE 10 2005 058 613.9 filed on Dec. 7, 2005. This German Patent Application, whose subject matter is incorporated here by reference, provides the basis for a claim of priority of invention under 35 U.S.C. 119(a)-(d).

BACKGROUND OF THE INVENTION

The present invention relates to electrically operated tools. More particularly, it relates to a tool with a contact less switch.

From German Patent Application 10 2004 047 232.7, a handheld power screwdriver is known whose power takeoff mechanism is switched on and off by means of an actuating lever.

For the power takeoff mechanism to remain in operation, the actuating lever must be actively held constantly by the user. When the user presses the actuating lever into the housing interior, the power takeoff mechanism switches on; if the user releases the actuating lever, the power takeoff mechanism switches off. The disadvantage of this embodiment is that the tool user must always actively look for the pressure point of the switch in order to switch the tool on and off. Moreover, such a switch increases the effort and expense of maintaining the tool, since it comprises many moving parts, such as springs, plastic parts, bearing shafts, and so forth. These parts must first be manufactured and second installed on the device. The many small parts to be installed in this case increase the production costs for the tool and also increase the likelihood of failure. Moreover, each part is subject to a certain amount of wear, so that depending on how many hours the tool has been in operation and on the field in which it is used, a functional failure must be expected, sooner or later.

SUMMARY OF THE INVENTION

It is therefore the object of the present invention to modify the tool mentioned in such a way that secure, automatic actuation of tool functions is made possible, indeed automatically when the tool is picked up by the user.

This object is attained in that means for varying tool functions, such as switching the tool on and off, are implemented by means of a photoelectric cell, incorporated onto the surface of the handle in such a way that if the photoelectric cell is completely or partly covered, a tool function is activated on the specification of a predetermined sequence. In that case, the photoelectric cell can take on the function of a simple on/off switch.

If the photoelectric cell is covered by the user's hand, this is detected as an activation pulse, and a tool power takeoff mechanism that is for instance present begins to rotate. If the worker sets the tool down and removes his palm from the photoelectric cell, this is recognized as a deactivation pulse and the power takeoff mechanism is braked. As a rule, the tool functions are implemented by means of a controller that the tool includes and that is embodied as a function of external control pulses, such as the signal of the photoelectric cell. In the simplest case, the aforementioned predetermined sequence is the process of switching the tool on and off as already described above. However, it is also conceivable for far more-complex tool functions to be switched via the photoelectric cell.

The advantage of this embodied is that no mechanical means, such as mechanical switches, whatever are needed, and thus a wear-free switching function can be achieved. The photoelectric cell furthermore requires less space than the mechanical switch and can be installed faster and more simply, and as a result the production costs for the tool can be reduced. A further advantage of this embodiment is the automatic activation of predetermined functions when the user picks up the tool. The user therefore need not intentionally actuate the switching means or look for the pressure point; the tool switches itself on all by itself when the user uses it.

Advantageously, the tool additionally includes an electrical light source, in particular a high-powered light emitting diode, halogen light, or the like, which is switched on and off by means of the photoelectric cell. The advantage here is that the working environment when the tool is being used is automatically illuminated, so that additional light sources become superfluous. A dimmer function control by the means of the photoelectric cell would also be conceivable.

Advantageously, the photoelectric cell is located inside the handle, and the handle has a recess which is provided with a transparent covering that makes a flush closure with the handle surface. As a result, a closed housing is obtained, so that dirt or moisture can be prevented from getting into the surroundings of the photoelectric cell. Cleaning the tool also becomes substantially simpler as a result, since the photoelectric cell is let into the handle, so that any dirt particles or oil smears that may be present can be eliminated extremely simply by simply wiping off the handle. Moreover, the handle rests more comfortably in the user's hand and thus avoids irritation from switching means that in the prior art typically rise above the surface of the handle.

The electrical light source is in particular a screwdriving tool or riveting tool, in which the light source is located on the tool housing or inside the tool housing in the immediate vicinity of the screwdriving device (power takeoff mechanism) or the riveting device (rivet-holding mechanism). Thus automatic, aimed lighting precisely at the point where a machining operation is to be done is achieved. This makes it unnecessary to carry an additional lighting fixture along.

The novel features of the which are considered as characteristic for the present invention are set forth in particular in the appended claims. The invention itself, however, both as to its construction and its method of operation, together with additional objects and advantages thereof, will be best understood from the following description of specific embodiments when read in connection with the accompanying drawings.

DESCRIPTION OF THE PREFERRED EMBODIMENTS

Figure 1:
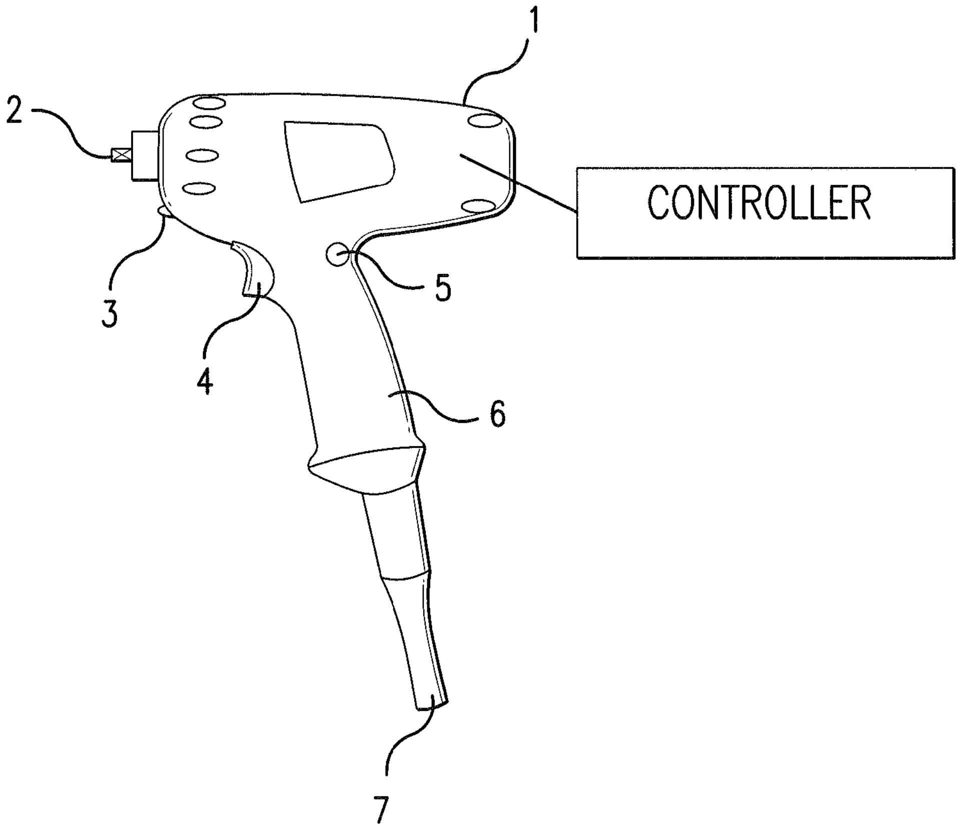
FIG. 1 is a single FIGURE of the drawing which shows a tool with a contactless switch in accordance with one embodiment of the present invention.

FIG. 1 shows a handheld power screwdriver 1, of the kind that in terms of its shape is known from the prior art. The handheld power screwdriver 1 of the invention includes a power takeoff mechanism 2, a lighting means 3, a main switch 4, a photoelectric cell 5, a handle 6, and a power cord 7. The handheld power screwdriver shown here is connected to the electrical power system by means of the cord connection 7. Naturally this could also be a battery-operated device that requires no cord whatever. In the case of a riveting tool, the power takeoff mechanism would be replaced by the rivet-holding mechanism.

The power takeoff mechanism 2 of the handheld power screwdriver is switched on and off by means of the main switch 4. Intermediate stages of the main switch 4 cause a change in the rpm of the power takeoff mechanism.

The photoelectric cell located on the upper end of the handle 6 is covered, when the worker picks up the handheld power screwdriver, by the worker's thumb, assuming here that the worker is right-handed. This complete or even partial covering causes the photoelectric cell to detect a lesser incidence of light. The photoelectric cell located in the interior of the hollow handle 6 is wired in such a way that if it is partly or completely covered, the light source 3 is switched on. If the worker sets the handheld power screwdriver 1 down again, the photoelectric cell again detects an incidence of light and switches the work site lighting 3 off. During work with the tool as well, the worker has the capability of controlling the light source, using his thumb. A slight shift of the thumb above or below the photoelectric cell can cause the lighting means 3 to be switched on and off.

As a rule, the tool is surrounded by a complex plant with control and power supply electronics. If there is no night shift, then the plant is shut down centrally, so that unintentional switching on of the device during darkness is avoided.

The lighting means, in this case in the form of a powerful white LED, is located on the power takeoff side, below the power takeoff mechanism. The lighting means can be let into the housing of the handheld power screwdriver 1 and additionally isolated from environmental factors by means of a transparent protective covering, or it can be installed protruding from the housing, in which case it is more easily replaced. Installing it below the power takeoff mechanism is preferred, since installation above the power takeoff mechanism, for instance, can cause the power takeoff mechanism itself, or a rod linkage located on the power takeoff mechanism, to cast a shadow, and then the usage site will not be optimally lighted.

It will be understood that each of the elements described above, or two or more together, may also find a useful application in other types of constructions differing from the type described above.

While the invention has been illustrated and described as embodied in a tool with contactless switch, it is not intended to be limited to the details shown, since various modifications and structural changes may be made without departing in any way from the spirit of the present invention.

Without further analysis, the foregoing will so fully reveal the gist of the present invention that others can, be applying current knowledge, readily adapt it for various applications without omitting features that, from the standpoint of prior art, fairly constitute essential characteristics of the generic or specific aspects of this invention.

The invention claimed is:

1. A screw-driving or riveting tool, comprising:

a hollow handle;

a main switch disposed on said handle;

a controller for automatically activating and varying a plurality of tool functions, wherein said tool functions can be automatically activated when said tool is picked up by an operator of said tool;

a photoelectric cell incorporated onto said hollow handle in such a way and configured that if said photoelectric cell is completely or partly covered by contact of a hand of said operator, covering of the photoelectric cell by said contact is recognized by said photoelectric cell as an activation pulse, whereby said activation pulse is configured to switch on said tool functions, whereby said tool functions enable a plurality of tool features of said screw-driving or riveting tool, and wherein uncovering of the photoelectric cell is recognized as a deactivation pulse, wherein said deactivation pulse is configured to switch off said tool functions; and an electric light source, wherein said electrical light source is configured as a high-powered light emitting diode which is switched by said photoelectric cell, wherein the photoelectric cell is positioned on an upper end of the handle laterally relative to the main switch, whereby said light source is configured to be switched on and off by selective positioning of a hand of the operator of said tool.

2. The tool as defined in claim 1, wherein said photoelectric cell is located inside said handle, said handle having a handle surface and a recess which is provided with a transparent covering that makes a flush closure with said handle surface.

3. The tool as defined in claim 1, wherein the electric tool is a screwdriving tool having a screwdriving device in the form of a power takeoff mechanism, wherein said light source is located at a location selected from the group consisting on a tool housing and inside the tool housing, and in an immediate vicinity of said screwdriving device.

4. The tool as defined in claim 1, wherein the electric tool is a riveting tool having a riveting device in the form of a rivet-holding mechanism, wherein said light source is located at a location selected from the group consisting on a tool housing and inside the tool housing, and in an immediate vicinity of said riveting device.

5. The tool as defined in claim 1, wherein said power takeoff mechanism is arranged so that said light source is located such that said power takeoff mechanism does not affect an area illuminated by light emitted from said light source.

6. The tool as defined in claim 4, wherein said light source is located such that said riveting device does not affect an area illuminated by light emitted from said light source.

* * * * *